US012129047B2

(12) United States Patent
Shimizu et al.

(10) Patent No.: US 12,129,047 B2
(45) Date of Patent: Oct. 29, 2024

(54) AIRCRAFT LIGHTING UNIT WITH LENS THAT SPLITS LIGHT OF SINGLE LIGHT-EMITTING ELEMENT IN DIFFERENT DIRECTIONS

(71) Applicant: KOITO MANUFACTURING CO., LTD., Tokyo (JP)

(72) Inventors: Hiroto Shimizu, Shizuoka (JP); Kenichi Shimizu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/546,551

(22) PCT Filed: Feb. 17, 2022

(86) PCT No.: PCT/JP2022/006366
§ 371 (c)(1),
(2) Date: Aug. 15, 2023

(87) PCT Pub. No.: WO2022/185939
PCT Pub. Date: Sep. 9, 2022

(65) Prior Publication Data
US 2024/0132229 A1   Apr. 25, 2024
US 2024/0228060 A9   Jul. 11, 2024

(30) Foreign Application Priority Data
Mar. 3, 2021 (JP) .................................. 2021-033357

(51) Int. Cl.
*B64D 47/06* (2006.01)
*F21S 41/141* (2018.01)
(Continued)

(52) U.S. Cl.
CPC ............ *B64D 47/06* (2013.01); *F21S 41/141* (2018.01); *F21S 41/295* (2018.01); *F21V 5/04* (2013.01);
(Continued)

(58) Field of Classification Search
CPC ... B64D 47/06; B64D 2203/00; F21S 41/141; F21S 41/295; F21V 5/04; F21W 2107/30; F21Y 2115/10
See application file for complete search history.

(56) References Cited

U.S. PATENT DOCUMENTS

| 2020/0047917 | A1* | 2/2020 | Yoda ...................... B64D 47/02 |
| 2022/0106057 | A1 | 4/2022 | Mukai et al. |
| 2022/0252242 | A1 | 8/2022 | Tsukamoto et al. |

FOREIGN PATENT DOCUMENTS

| JP | 2014-013744 A | 1/2014 |
| WO | 2020/153400 A1 | 7/2020 |
| WO | 2021/010271 A1 | 1/2021 |

OTHER PUBLICATIONS

Sekiguchi et al. JP,2014-013744,A, machine translation Jan. 2014 (Year: 2014).*

(Continued)

*Primary Examiner* — Tracie Y Green
(74) *Attorney, Agent, or Firm* — Pearne & Gordon LLP (57) ABSTRACT

An aircraft light is provided which can illuminate an illuminated area with appropriate levels of illuminance. An aircraft light is configured, including: at least one or more light-emitting elements as light sources; and an inner lens configured to project light emitted from the light-emitting elements onto a desired area, in which the inner lens has a lens that splits light of a single light-emitting element in different directions. According to this aspect, both a far illuminated area and a near illuminated area can be illuminated, and the luminous intensity can also be adjusted by (Continued)

adjusting the amount of a beam to be split; therefore, an illuminated area can be illuminated with appropriate levels of illuminance.

4 Claims, 9 Drawing Sheets

(51) Int. Cl.
*F21S 41/29* (2018.01)
*F21V 5/04* (2006.01)
*F21W 107/30* (2018.01)
*F21Y 115/10* (2016.01)

(52) U.S. Cl.
CPC ..... *B64D 2203/00* (2013.01); *F21W 2107/30* (2018.01); *F21Y 2115/10* (2016.08)

(56) References Cited

OTHER PUBLICATIONS

International Search Report dated Apr. 19, 2022 filed in PCT/JP2022/006366.

\* cited by examiner

(A) INNER LENS (B) LIGHT SOURCE BOARD (C) LIGHT SOURCE BOARD AND INNER LENS

AIRCRAFT LIGHTING UNIT WITH LENS THAT SPLITS LIGHT OF SINGLE LIGHT-EMITTING ELEMENT IN DIFFERENT DIRECTIONS

TECHNICAL FIELD

The invention of the present application relates to an aircraft light mounted and used on, for example, the airframe of an aircraft.

BACKGROUND ART

Aircraft lights include various types of lights as external illumination depending on the intended use (for example, Patent Literature 1). There are, for example, an anti-collision light for avoiding a collision between aircrafts, a navigation light indicating the flight attitude and flight direction of the airframe, a landing light for illuminating a runway at the time of take-off and landing, and an ice inspection light for checking for ice formation on the airframe during high-altitude flight.

CITATION LIST

Patent Literature

Patent Literature 1: WO 2020/153400 A

SUMMARY OF INVENTION

Problems to be Solved by Invention

An illuminated area of such an aircraft light may be wide or include a plurality of areas since the aircraft has a large airframe. The aircraft light is desired to illuminate the illuminated area with appropriate levels of illuminance.

The present invention has been made in view of the above, and provides an aircraft light that can illuminate an illuminated area with appropriate levels of illuminance.

Solution to Problems

In order to solve the above problem, an aircraft light according to the configuration of the present disclosure is configured, including: at least one or more light-emitting elements as light sources; and an inner lens configured to project light emitted from the light-emitting elements onto a desired area, in which the inner lens has a lens that splits light of a single light-emitting element in different directions.

According to this aspect, one light-emitting element can illuminate a plurality of areas spaced apart from one another. Moreover, the amount of abeam to be split is adjusted. Therefore, an area with a desired luminous intensity can be formed. It is possible to flexibly adjust light distribution by, for example, illuminating a far area with a high luminous intensity and illuminating a near area with a low luminous intensity, and it is possible to illuminate an illuminated area with appropriate levels of illuminance.

Moreover, in one aspect, the lens is a multi-curved surface lens including a plurality of lens surfaces whose regions partially overlap one another. By adopting such a form for the lens, it is possible to create a plurality of regions from one light-emitting element and to form desired light distribution.

Moreover, in one aspect, it is configured in such a manner that the number of the light-emitting elements is at least two or more, and a first illumination area to be illuminated with a part of a beam emitted from a first light-emitting element and split by the lens at least partially overlap with a second illumination area to be illuminated with a beam emitted from a second light-emitting element. The illumination areas of the plurality of light-emitting elements overlap with one another. Therefore, the luminous intensity can be increased, and a far illuminated area is also illuminated with an appropriate level of illuminance.

Moreover, in one aspect, it is configured in such a manner that a light-emitting surface of at least one of the light-emitting elements has a shape that is long in one direction. The illumination area can be formed to be long in one direction, and the illuminated area can be illuminated with appropriate levels of illuminance even if the illuminated area is long in one direction.

Moreover, in one aspect, it is configured in such a manner that the number of the light-emitting elements is at least two or more, and one of the light-emitting elements is placed in a mounting direction different from a mounting direction of the other light-emitting elements. Since the illumination area depends also on the form of the light-emitting elements, the mounting angles are made different in this manner; therefore, the illumination area can be formed in a form with a higher degree of flexibility.

Effects of Invention

As is clear from the above description, an aircraft light is provided which can illuminate an illuminated area with appropriate levels of illuminance.

BRIEF DESCRIPTION OF DRAWINGS

FIG. 7(A) is a plan view of the multi-curved surface lens portion, and FIG. 7(B) is a schematic cross-sectional view in a state where a light source board 20 is fixed together with an inner lens 10.

DESCRIPTION OF EMBODIMENTS

Figure 1:
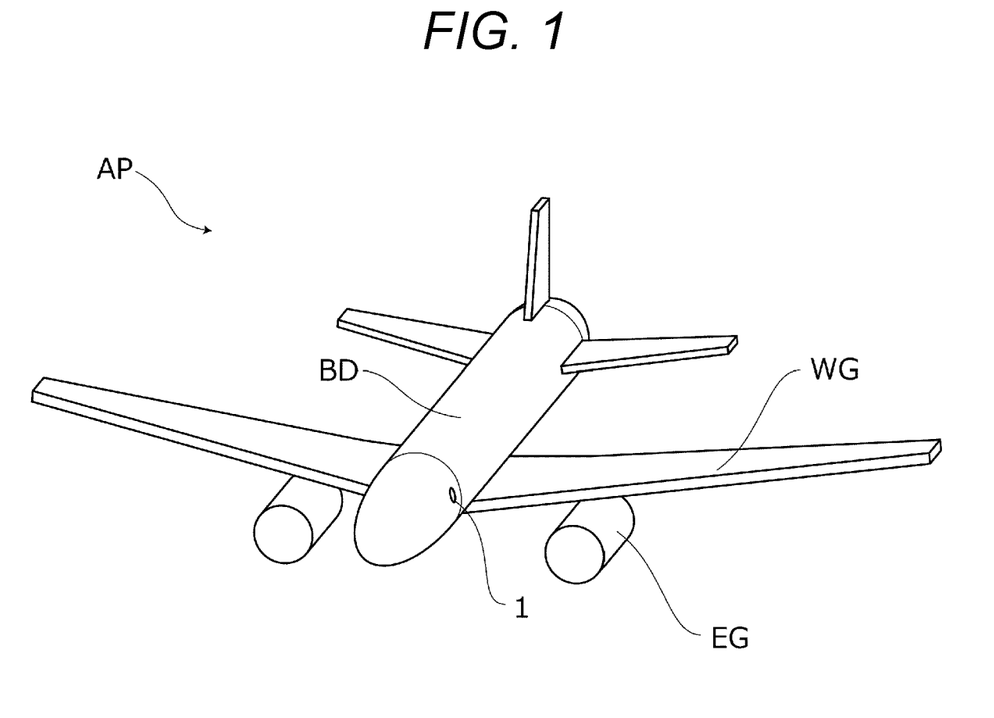
FIG. 1 is a schematic perspective view of an aircraft equipped with an aircraft light according to an embodiment of the present invention.

A preferred embodiment according to the configuration of the present disclosure is described hereinafter with reference to the drawings. FIG. 1 is a schematic perspective view of an aircraft AP including aircraft lights 1 according to the embodiment.

The aircraft AP includes a pair of the aircraft lights 1 on the left and right side surfaces of the front part of a fuselage BD. The aircraft lights 1 are lighting (ice inspection lights)

for inspecting for ice build-up, and illuminate left and right main wings WG and engines EG to inspect them for the condition of ice formation. Hereinafter, attention is focused on the aircraft light 1 on the left side of the aircraft AP, and the description of the aircraft light 1 on the right side having the same configuration is omitted.

Figure 2:
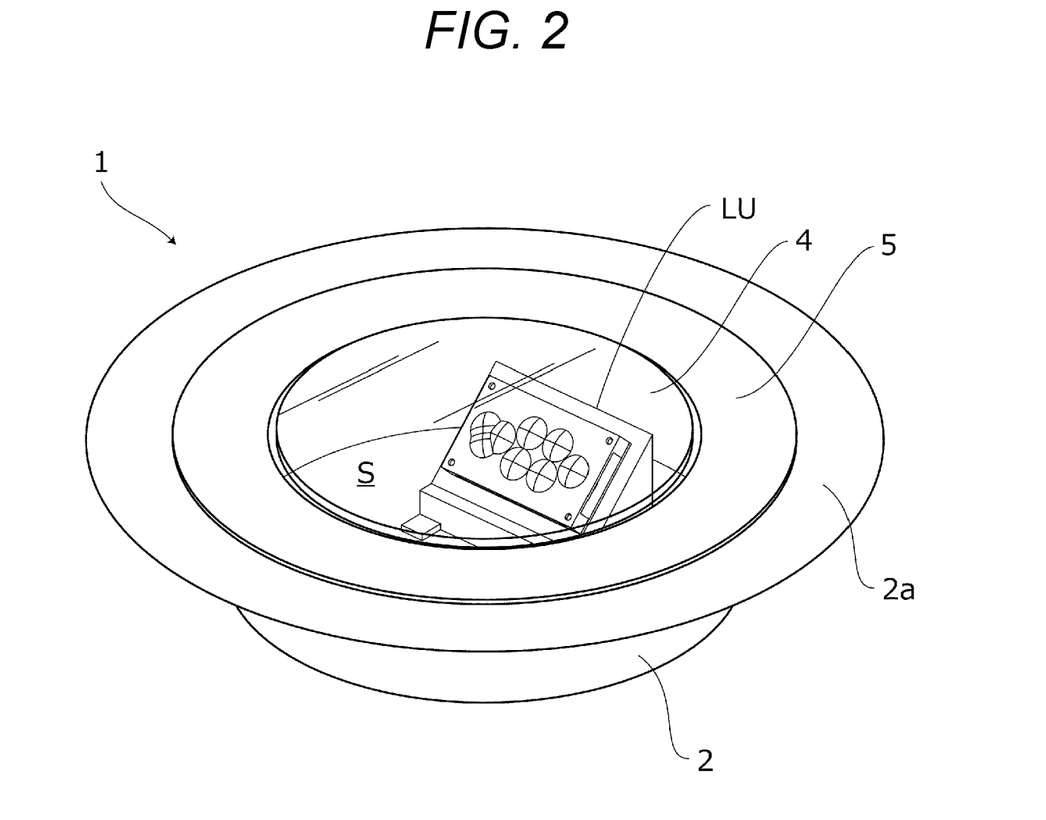
FIG. 2 is a perspective view of the aircraft light.
Figure 3:
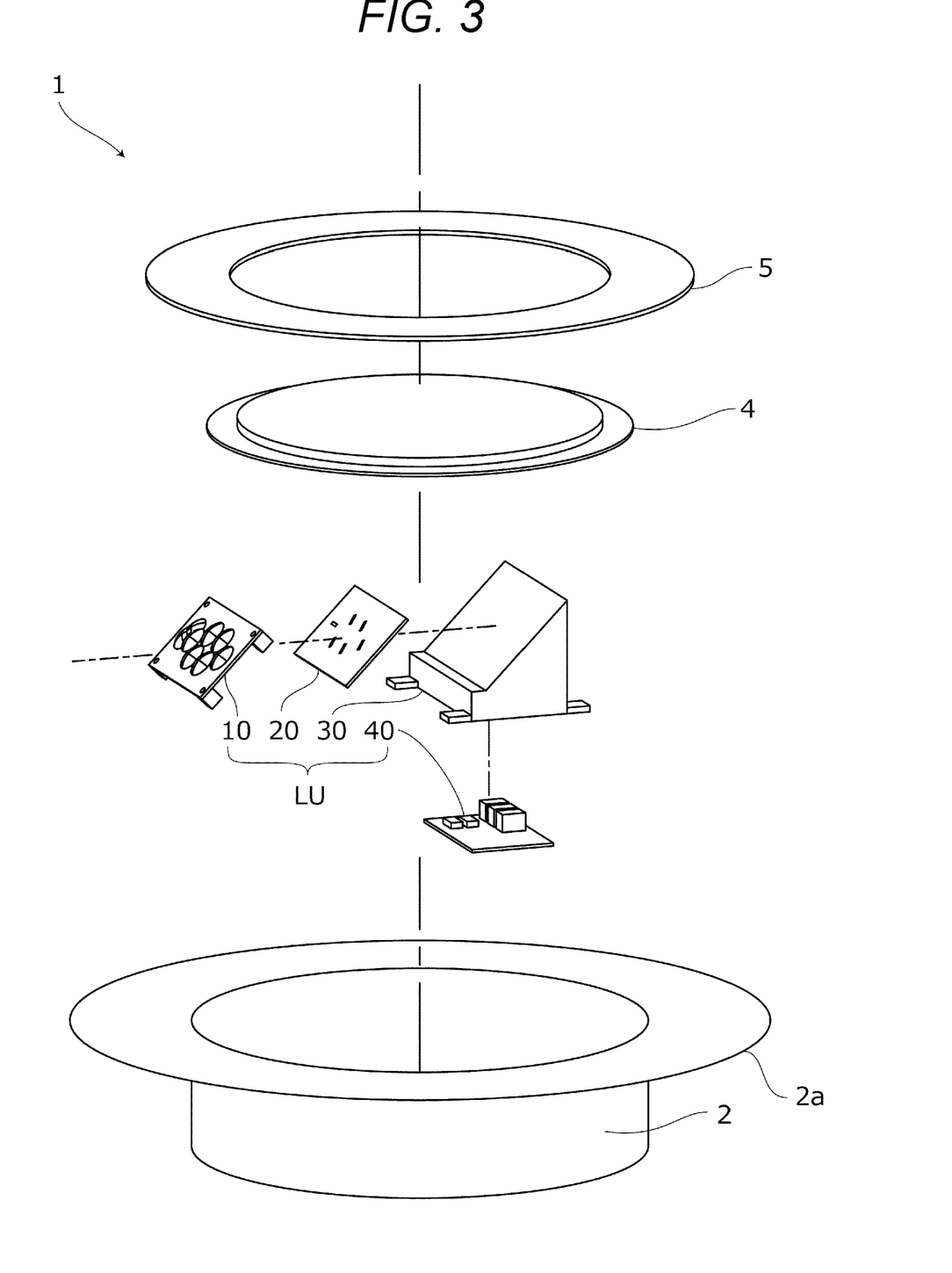
FIG. 3 is an exploded perspective view of the aircraft light.

FIG. 2 is an external perspective view of the aircraft light 1, and FIG. 3 is an exploded perspective view of the aircraft light 1.

As illustrated in FIGS. 2 and 3, the aircraft light 1 has a generally thick disk-shaped outer shape, and includes a lamp body 2 and an outer lens 4, as a housing. In the following description of the light, directions of front, back, left, right, up, and down are indicated, assuming that a direction in which the lamp body 2 and the outer lens 4 are coupled to each other is an up-and-down direction, the outer lens 4 is up, and the lamp body 2 is down. Note that the description of these directions is for convenience, and the implementation of the invention is not limited to these directions.

The lamp body 2 is manufactured by pressing a flat plate metal member such as aluminum, and is formed in a circular container shape that is open on the upper side, in which the opening portion is provided at its edge with a flange portion 2*a*. The outer lens 4 made of a resin member having transparency is mounted at the opening portion of the lamp body 2, and a light chamber S is defined in the lamp body 2. A disk-shaped cover 5 including a hole in the center is used to mount the outer lens 4. The cover 5 is fastened to the lamp body 2 from the outside with the outer lens 4 sandwiched therebetween to fix the outer lens 4 to the lamp body 2. A lamp unit LU is housed in the defined light chamber S.

In the fuselage BD of the aircraft AP, an unillustrated placement recess is formed at the mounting position of the aircraft light 1. The flange portion 2*a* is put on the edge of the placement recess to place the aircraft light 1, and the flange portion 2*a* is screwed to the fuselage BD to mount the aircraft light 1 on the aircraft AP.

(Lamp Unit)

Figure 4:
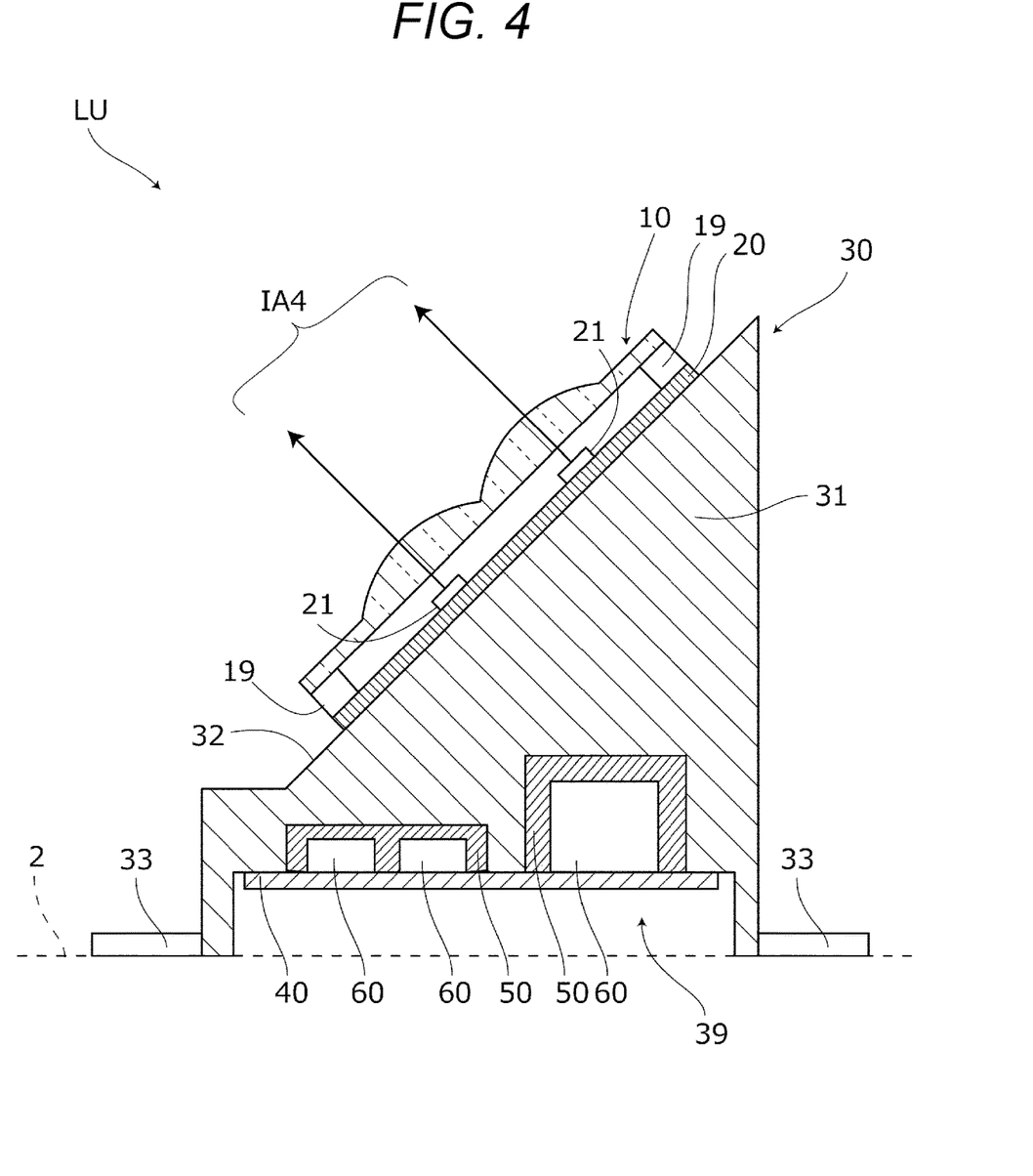
FIG. 4 is a schematic cross-sectional view of a lamp unit.

The lamp unit LU is described in detail. FIG. 4 is a schematic cross-sectional view of the lamp unit LU.

The lamp unit LU is configured, including an inner lens 10, a light source board 20, a control board 40, and a holding member 30 on which the inner lens 10, the light source board 20, and the control board 40 are mounted.

The holding member 30 is made of, for example, a metal member such as aluminum, and is integrally formed in its entirety. The upper part of the holding member 30 is a base portion 31 for fixing the light source board 20 and the inner lens 10, and the upper surface on which the light source board 20 and the inner lens 10 are placed is an inclined surface 32 inclined at a predetermined angle relative to the bottom surface. Moreover, the lower part of the holding member 30 is a holding portion of the control board 40, and a recess 39 for housing and holding the control board 40 is formed in the bottom surface of the holding member 30. Mounting portions 33 are formed at four corners of the bottom surface of the holding member 30. The holding member 30 is fixed to the inner bottom surface of the lamp body 2 with screws at the mounting portions 33.

The front surface of the light source board 20 is equipped with a plurality of light-emitting elements being light sources.

The inner lens 10 is formed of a transparent member such as glass or polycarbonate resin, and is formed in a plate shape having substantially the same outer shape as that of the light source board 20.

Mounting leg portions 19 are provided at four corners of the bottom surface of the inner lens 10, and each include, in the center, an insertion hole 18 formed in a thickness direction thereof. Moreover, through-holes 29 are also provided at four corners of the light source board 20, corresponding to the insertion holes 18. Unillustrated fixing members such as screws are inserted through the insertion holes 18 of the inner lens 10 and the through-holes 29 of the light source board 20 in this order and fastened to the inclined surface 32. As a result, the light source board 20 and the inner lens 10 are integrally assembled to the inclined surface 32 in a stacked state.

The light source board 20 is mounted on the inclined surface 32 of the metal holding member 30, and heat generated by the light emission of the light-emitting elements is transferred to the holding member 30. In order to increase the heat transfer efficiency, a heat transfer sheet may be interposed between the light source board 20 and the inclined surface 32.

The control board 40 is equipped with an electronic component 60 for controlling turning on of the light-emitting elements installed on the light source board 20. The electronic component 60 is installed on the front surface of the control board 40, and is mounted from the bottom surface of the holding member 30 toward the recess 39. Since the control board 40 is mounted in the recess 39 recessed upward with the upper surface facing the recess 39, the electronic component 60 is placed, oriented toward the inside of the recess 39.

A heat transfer member 50 is placed in such a manner as to fill the gap between the recess 39 and the control board 40, and the heat generated by the electronic component 60 is transferred to the holding member 30 via the heat transfer member 50. A heat transfer grease being a clay filler is used for the heat transfer member 50.

The heat transfer member 50 is interposed between the control board 40 and the holding member 30 to thermally connect the control board 40 to the holding member 30. Since the holding member 30 made of a metal member is directly mounted at the inner bottom surface of the lamp body 2 made of metal, the heat generated by the light source board 20 and the control board 40 is further transferred to the lamp body 2. The heat of the lamp body 2 is still further transferred to the fuselage BD, where the lamp body 2 is mounted, of the aircraft AP. It is configured in such a manner that the heat generated by the lamp unit LU is dissipated by the high-volume lamp body 2 and fuselage BD via the holding member 30 and the heat transfer member 50.

The above configuration allows the heat generated by the control board 40 and the light source board 20 to be transmitted to the outside while the sealed condition of the light chamber S of the aircraft light 1 is maintained. Safety is secured, and reliability as the light is also secured.

(Inner Lens 10 and Light Source Board 20)

Figure 5:
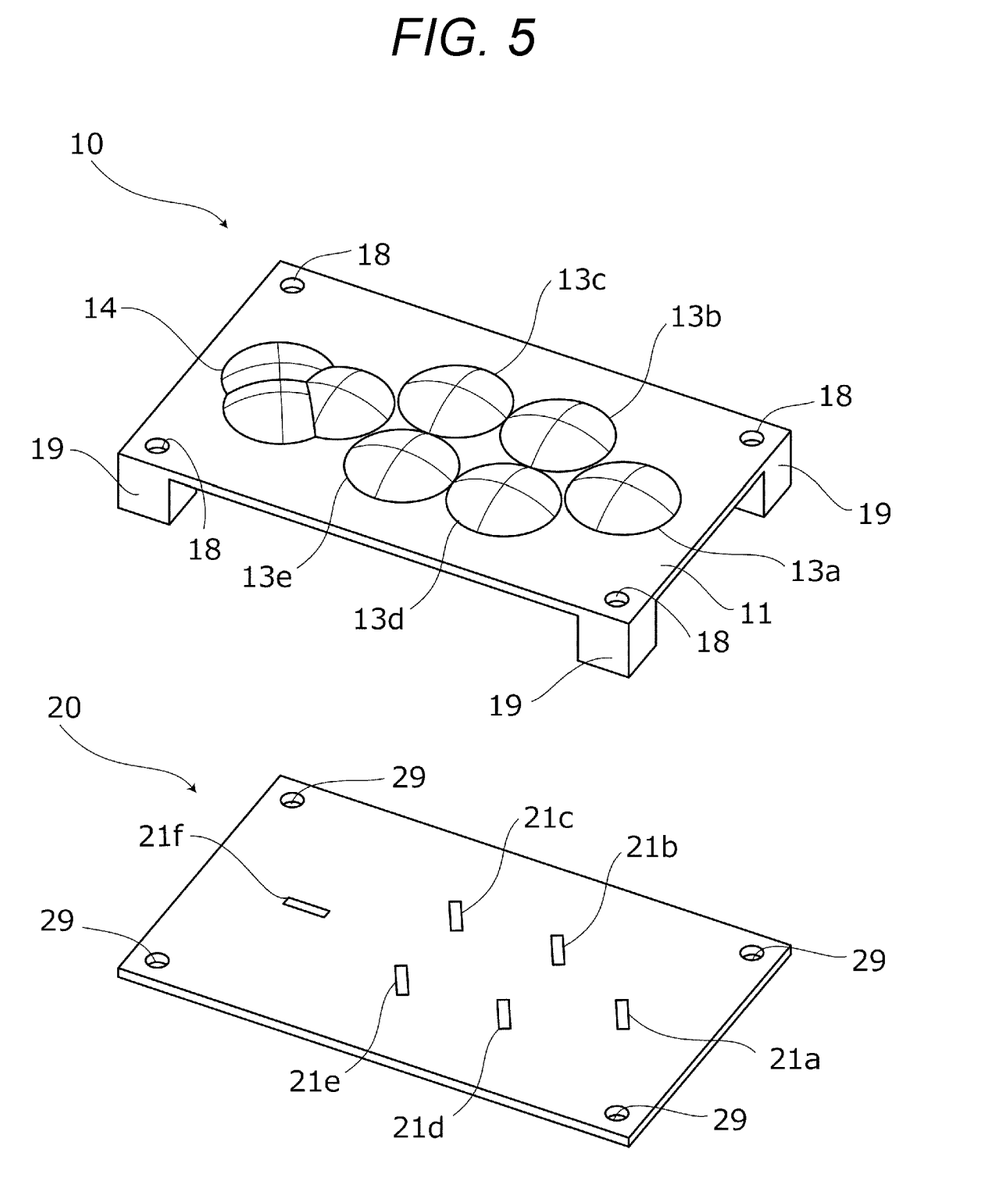
FIG. 5 is an exploded perspective view of a light source board and an inner lens.
Figure 6:
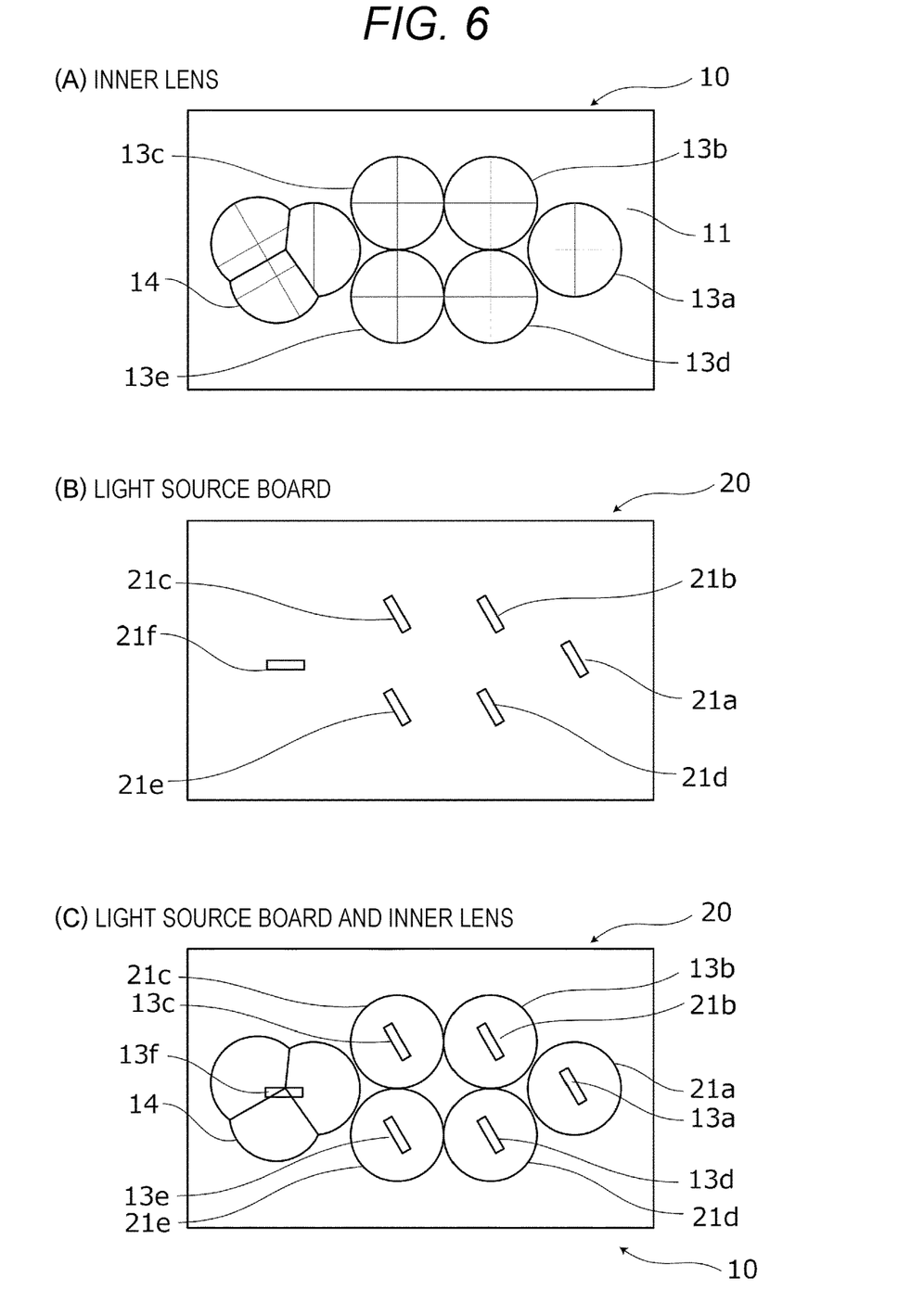
FIG. 6 shows plan views of the light source board and the inner lens.

Next, the inner lens 10 and the light source board 20 are described in detail. FIG. 5 is an exploded perspective view of the inner lens 10 and the light source board 20. FIG. 6 shows plan views of the inner lens 10 and the light source board 20. FIG. 6(A) is a plan view of the inner lens 10. FIG. 6(B) is a plan view of the light source board 20. FIG. 6(C) is a plan view of a state in which the light source board 20 and the inner lens 10 are stacked.

The rectangular light source board 20 is equipped, on the front surface, with six LEDs 21*a* to 21*f* as the light-emitting elements. When the LEDs 21*a* to 21*f* are collectively referred to below, they are referred to hereinafter as the LEDs 21.

Each of the LEDs 21 has a rectangular shape formed to be long in one direction, and a light output axis thereof is oriented in the normal direction of the front surface (light-emitting surface) of the LED. The each of the LEDs 21 is configured as a white LED. Each of the white LEDs has a configuration in which a cover containing a phosphor that emits yellow light is stacked on an LED chip that is mounted on a base and emits blue light or ultraviolet light.

As illustrated in FIG. 6(A), the LEDs 21b and 21c are placed in slightly backward positions in the middle of the front surface of the light source board 20, spaced apart in the left-and-right direction from each other. The LEDs 21d and 21e are placed in slightly frontward positions in the middle of the front surface of the light source board 20, spaced apart in the left-and-right direction from each other. The LED 21b and the LED 21d are placed, aligned in the front-and-back direction. The LED 21c and the LED 21e are placed, aligned in the front-and-back direction. Moreover, the LED 21a is placed in the middle on the right side on the front surface of the light source board 20, and the LED 21f is placed in the middle on the left side on the front surface of the light source board 20.

A longitudinal direction of the light-emitting surface of each of the five LEDs 21a to 21e is not caused to agree with a longitudinal direction of the light source board 20. The each of the LEDs 21a to 21e is rotated by a predetermined angle about its respective light source optical axis. The light source optical axis is an emission direction of light travelling toward the inner lens 10. Only the LED 21f is placed in such a manner that a longitudinal direction of the light-emitting surface is caused to agree with the longitudinal direction of the light source board 20.

The inner lens 10 mainly includes a mounting plate portion 11, lens portions 13a to 13e and a multi-curved surface lens portion 14, which are each formed in a convex shape on the front surface of the mounting plate portion 11, and the mounting leg portions 19 provided at four corners of the rear surface of the mounting plate portion 11. These portions are integrally formed.

The inner lens 10 is configured in such a manner that the rear surface facing the light source board 20 is a light input surface, and the front surface is a light output surface. The inner lens 10 lets in light emitted from the LEDs 21a to 21f, and projects the light in predetermined directions. The lens portions 13a to 13e and the multi-curved surface lens portion 14 protrude from one surface of the mounting plate portion 11 in a thickness direction thereof, and are each formed in such a manner that the front surface thereof in the protruding direction is a convex curved surface in the protruding direction.

In a state where the inner lens 10 and the light source board 20 are placed on top of each other in the stacked state, the central portions of the lens portions 13a to 13e are formed in such a manner as to correspond to the LEDs 21a to 21e, and the central portion of the LED 21f is formed in such a manner as to correspond to the multi-curved surface lens portion 14.

The input surface of the inner lens 10 has a substantially flat shape. On the other hand, the output surface has a shape that is convex toward the light output direction. Each of the lens portions protrudes on the output surface side. The lens portions 13a to 13e and the multi-curved surface lens portion 14 are each a convex lens, and the inner lens 10 has a configuration in which the plurality of lenses is integrated. In the embodiment, the lens portions 13a to 13e and the multi-curved surface lens portion 14 are spaced apart from one another, but may have a configuration in which edge portions thereof partially overlap one another.

The output surfaces of the lens portions 13a to 13e are spherical or aspherical lenses, and have substantially the same shape. The lens portions 13a to 13e are configured in such a manner as to project the light emitted from the LEDs 21a to 21e substantially parallel, or as beams diverging in an angular range somewhat wider than the parallel light, each light or beam being projected in the same direction. The light emitted from the LEDs 21a to 21e is combined to brightly illuminate a fourth illumination area IA4. The illumination area of the light emitted from each lens portion is described below.

Figure 7:
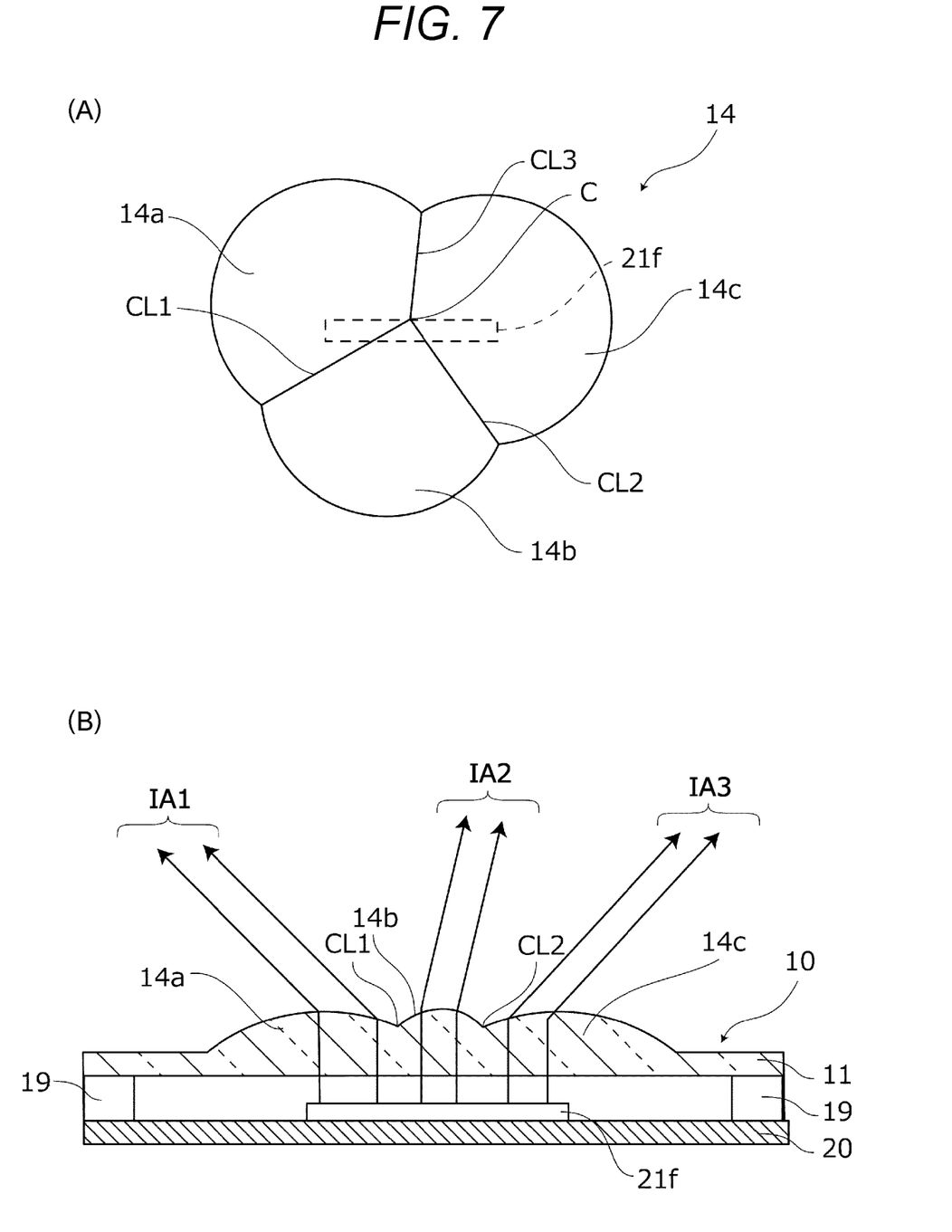
FIG. 7 shows explanatory diagrams of a multi-curved surface lens portion.

The multi-curved surface lens portion 14 is described with reference to FIG. 7. FIG. 7(A) is a plan view of the multi-curved surface lens portion 14. FIG. 7(B) is a schematic cross-sectional view of the multi-curved surface lens portion 14. In FIG. 7(B), it is assumed that the light source board 20 is fixed together with the inner lens 10.

The multi-curved surface lens portion 14 is a freeform lens formed by coupling three curved surfaces each having an output surface with a different curvature, and has an outer appearance in which regions of approximately three convex lenses partially overlap one another and are integrated.

The multi-curved surface lens portion 14 is divided into a first region 14a, a second region 14b, and a third region 14c as regions each including one of the three curved surfaces on the output surface side.

The first region 14a and the second region 14b are divided by an intersection line CL1 where the curved surfaces with different curvatures intersect each other. The second region 14b and the third region 14c are divided by an intersection line CL2 where the curved surfaces with different curvatures intersect each other. The third region 14c and the first region 14a are divided by an intersection line CL3 where the curved surfaces with different curvatures intersect each other.

The intersection lines CL1, CL2, and CL3 each have a locus extending radially from a center C which is a common end point in plan view. With such intersection lines CL1, CL2, and CL3, each of the first region 14a, the second region 14b, and the third region 14c is a region having an approximately fan shape in plan view.

The LED 21f, which is placed corresponding to the multi-curved surface lens portion 14, is placed in the central portion of the multi-curved surface lens portion 14 in plan view in such a manner as to be at least partially related to all of the first region 14a, the second region 14b, and the third region 14c.

The directions of light emission of the first region 14a, the second region 14b, and the third region 14c are different from one another. Therefore, apart of the light (beam) emitted from the LED 21f is incident on the first region 14a, and is then emitted toward a first illumination area IA1. Moreover, a part of the light emitted from the LED 21f is incident on the second region 14b and is then emitted toward a second illumination area IA2 different from the first illumination area IA1. Furthermore, a part of the light emitted from the LED 21f is incident on the third region 14c, and is then emitted toward a third illumination area IA3 different from both of the first illumination area IA1 and the second illumination area IA2.

The light incident on each region of the multi-curved surface lens portion 14 is emitted in a different predetermined direction according to the curved surface of the output surface, and mainly illuminates a different area. When the beam emitted from the LED 21f passes through the multi-curved surface lens portion 14, the beam is split into three different directions and the three split beams are emitted toward the different areas, respectively.

(Operations and Effects)

Figure 8:
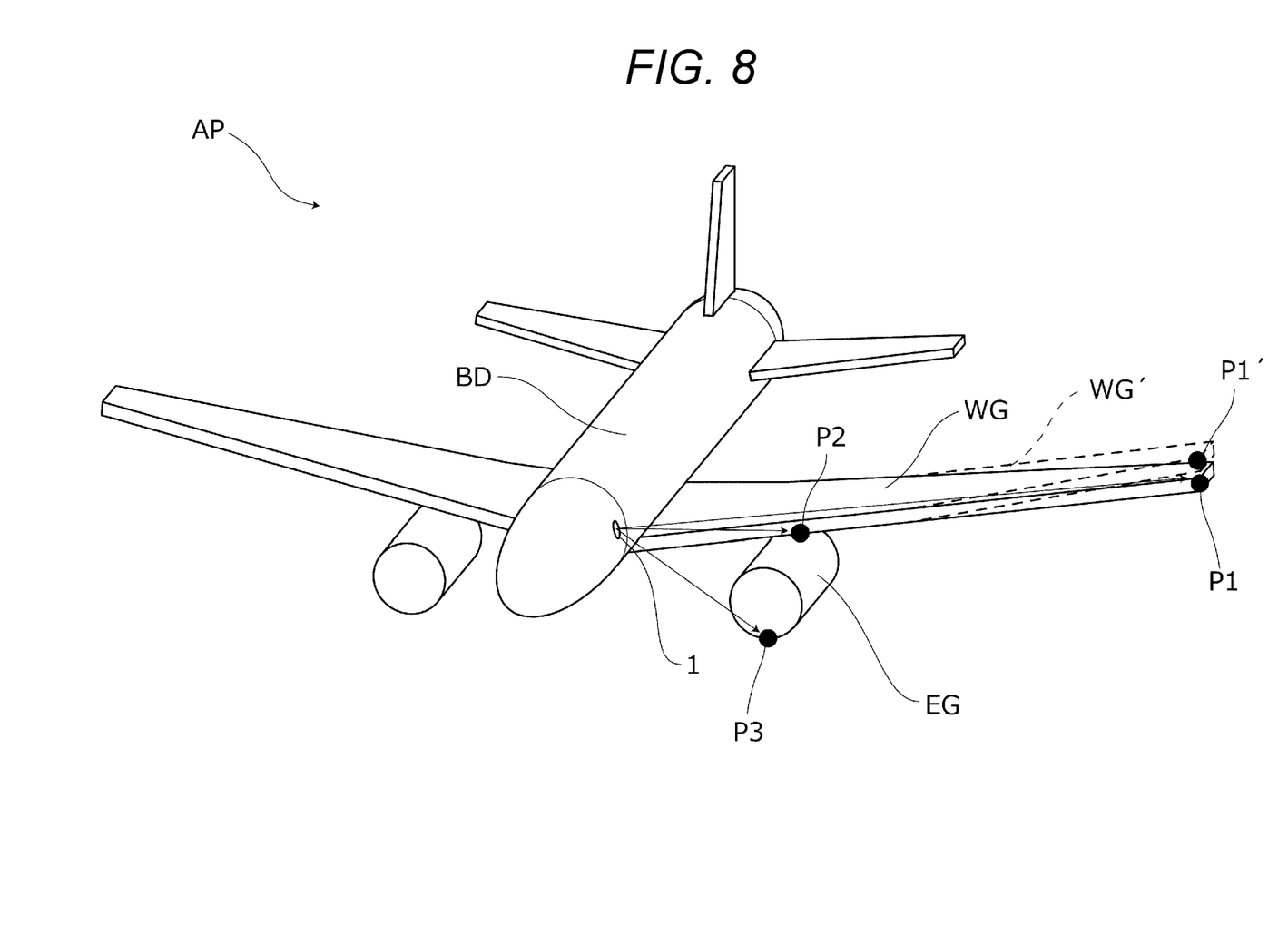
FIG. 8 illustrates an illuminated area of the aircraft light on the aircraft.
Figure 9:
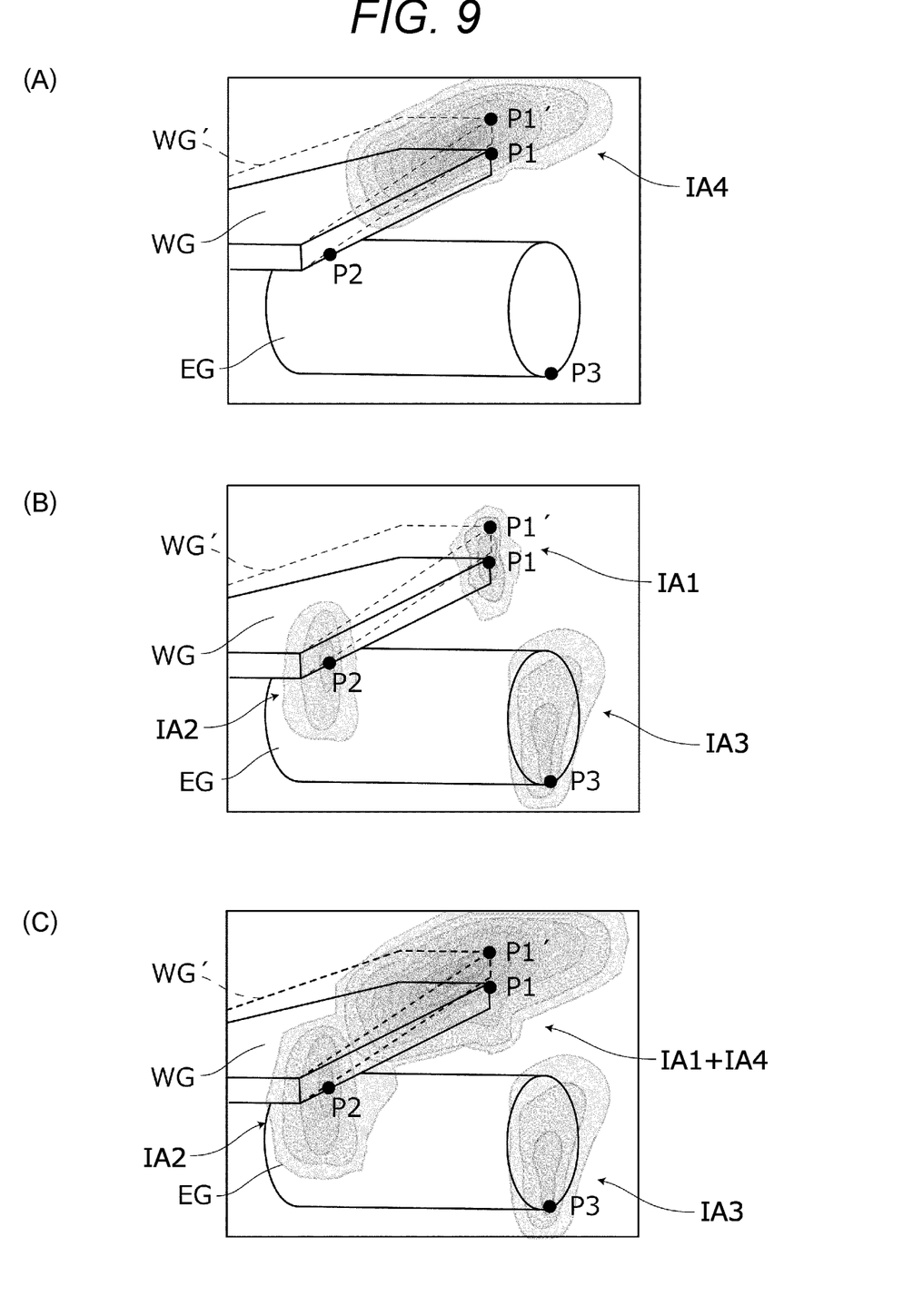
FIG. 9 shows luminous intensity distribution diagrams of the aircraft light.

The operations and effects of the aircraft light 1 having the above configuration are described with reference to the drawings. FIG. 8 is an explanatory diagram of an illuminated area of the aircraft light 1 on the aircraft AP. FIG. 9 shows luminous intensity distribution diagrams of the aircraft light 1. Each drawing illustrates the state of illumination of when the aircraft AP is equipped with the aircraft light 1, the state of illumination being superimposed on the state where the main wing WG and the engine EG are placed as viewed from the lamp unit LU in the optical axis direction of the LED 21. In other words, FIG. 9 illustrates light distribution in the actual equipped state. FIG. 9(A) is a luminous intensity distribution diagram of when only the LEDs 21a to 21e are turned on. FIG. 9(B) is a luminous intensity distribution diagram of when only the LED 21f is turned on. FIG. 9(C) is a luminous intensity distribution diagram of when all the LEDs 21a to 21f are turned on.

As illustrated in FIG. 1, the aircraft light 1 is mounted on the fuselage BD at a position somewhat forward and upward of the main wing WG. The orientation and placement position of the holding member 30 and the inclination angle of the inclined surface 32 are set in such a manner that the output surfaces of the LEDs 21 are oriented somewhat downward and backward relative to the aircraft AP in a state where the light source board 20 and the inner lens 10 are mounted on the inclined surface 32.

When the LEDs 21 are turned on by being operated by an operator, or by automatic control, the aircraft light 1 illuminates the main wing WG and the engine EG.

As illustrated in FIG. 8, the illuminated area of the aircraft AP to be illuminated by the aircraft light 1 mainly includes a leading end portion of the main wing WG stretching from a tip portion (a point P1) of the main wing WG, a junction portion (a point P2) of the engine EG with the main wing WG, and a leading end portion of the engine EG centered around a lower end portion (a point P3) of the front of the engine EG, which are places where ice is likely to build up. Hence, the area to be illuminated by the aircraft light 1 is a three-dimensional area that is wide in the left-and-right direction and also wide in both the up-and-down direction and the front-and-back direction, and includes three main areas that are spaced apart.

Moreover, when the aircraft AP is in flight, the main wing WG may bend, and the leading end portion of the main wing WG moves upward of the tip position in a normal condition in accordance with the bend. The tip portion of the main wing WG in the normal condition is denoted by the point P1, and the tip portion of a bent main wing WG' is denoted by a point P1'. Both points are illustrated in FIGS. 8 and 9.

As illustrated in FIG. 9(A), the center of the fourth illumination area IA4, which is the illumination area of the LEDs 21a to 21e, is aimed at an approximately middle position between the point P1 and the point P1', which indicate the tip of the main wing WG. The fourth illumination area IA4 is formed to be long in one direction, and a longitudinal direction of the fourth illumination area IA4 is configured in such a manner as to be along an extending direction of the main wing WG.

The fourth illumination area IA4 is set in such a manner that the leading end portion of the main wing WG is the illuminated area both in the normal condition where the main wing WG is not bent and in the condition where the main wing WG is bent. The fourth illumination area is in a form that the leading end portion of the main wing WG is illuminated regardless of a change in the condition of the main wing WG.

The leading edge portion of the main wing WG is an area where ice is particularly likely to form. However, the leading edge portion of the main wing WG extends over a wide area from the root portion to the tip portion of the main wing WG, that is, from the nearby point P2 to the far point P1, the area being long in one direction along the shape of the main wing WG. In addition, the point P1, which is the tip portion of the main wing WG, is very far from the fuselage BD on which the aircraft light 1 is installed; therefore, illumination having a high luminous intensity is required. Since the known aircraft light uses, for example, an optical member such as a reflector to distribute light, it is difficult to create such light distribution that appropriately illuminates the illuminated area.

In the embodiment, the fact that the outer shape of the illumination area based on the LED outgoing light through the lenses generally depends on the shape of the light output surfaces of the LEDs is used to form the fourth illumination area IA4 that is long in the one direction by use of the LEDs 21 that are long in the one direction, and the LEDs 21a to 21e are placed, rotating the longitudinal directions thereof, in such a manner that the longitudinal direction of the fourth illumination area IA4 agrees with the direction in which the leading end portion of the main wing WG extends.

To check for the condition of ice formation, when the illuminated area is near, the illuminated area is illuminated with a relatively low luminous intensity that is a sufficient illuminance level. However, the illuminated area needs to be illuminated with light having a high luminous intensity when the illuminated area is far, since the farther the illuminated area is, the lower the illuminance of the illuminated area is. Hence, it is configured in such a manner that the center of the fourth illumination area IA4 is set at the tip portion (the point P1 and the point P1') of the main wing WG that is the farthest; therefore, the point P1 and the point P1' are illuminated with light having a high luminous intensity obtained by combining the five white LED beams of the LEDs 21a to 21e, and the nearer the illuminated area is, the lower the luminous intensity of light to be projected. As a result, it is configured in such a manner that a sufficient level of illuminance is secured in the far area, and a sufficient level of illuminance is secured even in the near area, and the wide illuminated area extending from the near area to the far area is illuminated with appropriate levels of illuminance.

Next, the illumination area of the LED 21f is described with reference to FIG. 9(B). As illustrated in FIG. 7, the first region 14a, the second region 14b, and the third region 14c, which are the three regions forming the multi-curved surface lens portion 14, have different illumination directions, and therefore have different illumination areas of light emitted from the respective regions. The light emitted from the LED 21f is split into three different directions by the multi-curved surface lens portion 14, and the split beams travel toward the first illumination area IA1, the second illumination area IA2, and the third illumination area IA3, respectively.

As in the fourth illumination area IA4, the center of the first illumination area IA1, which is the illumination area with the light emitted from the first region 14a of the multi-curved surface lens portion 14, is roughly aimed at the middle position between the point P1 and the point P1'. The first illumination area IA1 is in a form of extending in the up-and-down direction in such a manner as to cover the point P1 and the point P1'. The first illumination area IA1 is formed to be long in the up-and-down direction, which is the moving direction of the tip portion of the main wing WG that moves by being bent, so that the tip portion is illuminated regardless of a change in the bending of the main wing WG.

The first illumination area IA1 and the fourth illumination area IA4 partially overlap each other. Therefore, the first illumination area IA1 and the fourth illumination area IA4 are combined when all the six LEDs 21 are turned on (refer to FIG. 9(C)). Hence, the leading end portion of the main wing WG is illuminated with appropriate levels of illuminance both in the normal condition and in the bent condition during flight.

The center of the second illumination area IA2, which is the illumination area of the light emitted from the second region 14b of the multi-curved surface lens portion 14, is aimed at the point P2. Hence, the junction portion of the engine EG is illuminated with a part of the outgoing light of the LED 21f.

The center of the third illumination area IA3, which is the illumination area of the light emitted from the third region 14c of the multi-curved surface lens portion 14, is aimed at the point P3. Hence, the leading end portion of the engine EG is illuminated with a part of the outgoing light of the LED 21f.

Since the beam of the LED 21f is split into three, the luminous intensity of each split beam is relatively low. However, the points P2 and P3 are relatively close to the installation position of the aircraft light 1. Hence, illumination having a low luminous intensity functions as a sufficient level of illumination. The junction portion of the engine EG and the leading end portion of the engine EG, which are important illuminated areas where ice is likely to form, are illuminated with illuminance sufficient to check for the condition of ice formation.

The multi-curved surface including the plurality of regions is used to split a beam of the light-emitting element into the different directions. Therefore, the plurality of areas can be illuminated with the single light-emitting element. Moreover, the ratio of the split beams is adjusted based on the area ratio of the regions of the multi-curved surface lens portion 14 related to the LED 21f. As a result, it is also possible to adjust the luminous intensity for each of the plurality of illumination areas. For example, the area ratio related to the LED is increased to increase the luminous intensity when a far illuminated area is illuminated, and the area ratio related to the LED is reduced to reduce the luminous intensity to a relatively low level when a near illuminated area is illuminated. Accordingly, it is also possible to illuminate all the illuminated areas including the far and near illuminated areas with appropriate levels of illuminance.

In addition, when the illuminated area is far, the number of LEDs is increased to illuminate the same illuminated area, so that a necessary level of illuminance can be secured. Moreover, adjustments to the shape and mounting angle of the LEDs enable appropriately illuminating even an illuminated area that is long in one direction.

Conventionally, when an illuminated area includes a plurality of areas spaced apart from one another, the number of light-emitting elements and the number of optical members that distribute light are required, the numbers being equal to the number of the areas. Therefore, the numbers of light-emitting elements and optical members also increase. Consequently, there is a problem that the number of components increases. The aircraft light 1 distributes light by using the light source board 20 equipped with the plurality of LEDs 21 and the flat plate-shaped inner lens 10. The aircraft light 1 is small in its entirety, hence space-saving. According to the configuration of the present disclosure, it is possible to provide a small and lightweight aircraft light that can illuminate even an illuminated area including a plurality of areas including both far and near areas, and a wide illuminated area, with appropriate levels of illuminance.

Up to this point the preferred embodiments of the present invention have been described. However, the above embodiments are examples of the present invention, and can be combined on the basis of knowledge of those skilled in the art, and such a form is also included in the scope of the present invention.

The present international application claims priority based on Japanese Patent Application No. 2021-033357, which is a Japanese patent application filed on Mar. 3, 2021, the entire contents of which are incorporated herein by reference.

The above description of the specific embodiments of the present invention has been presented for the purpose of illustration. They are not intended to be exhaustive or to limit the present invention as they are in the forms described. It is obvious to those skilled in the art that many modifications and alterations can be made in light of the above description.

LIST OF REFERENCE SIGNS

1 Aircraft light
10 Inner lens
13a to 13e Lens portion
14 Multi-curved surface lens portion
15 Light source board
21 LED
30 Holding member
40 Control board
50 Heat transfer member
AP Aircraft
IA1 to IA4 Illumination area

The invention claimed is:
1. An aircraft light comprising:
at least one or more light-emitting elements as light sources; and
an inner lens configured to project light emitted from the light-emitting elements onto a desired area,
the inner lens includes a lens that splits light of a single light-emitting element in different directions,
the lens is a multi-curved surface lens including a plurality of lens surfaces whose regions partially overlap one another,
the multi-curved surface lens is a freeform lens formed by coupling three curved surfaces each having an output surface with a different curvature,
the multi-curved surface lens is divided into a first region, a second region, and a third region,
the single light-emitting element is placed in the central portion of the multi-curved surface lens in plan view in such a manner as to be at least partially related to all of the first region, the second region, and the third region,
the directions of light emission of the first region, the second region, and the third region are different from one another, wherein
when a beam emitted from the single light-emitting element passes through the multi-curved surface lens, the beam is split into three different directions.

2. The aircraft light according to claim 1, wherein
the number of the light-emitting elements is at least two or more, and
a first illumination area to be illuminated with a part of the beam emitted from the single light-emitting element and split by the multi-curved surface lens at least partially overlaps with a second illumination area to be illuminated with a beam emitted from the other light-emitting elements.

3. The aircraft light according to claim 1, wherein a light-emitting surface of at least one of the light-emitting elements has a shape that is long in one direction.

4. The aircraft light according to claim 1, wherein
the number of the light-emitting elements is at least two or more, and
the single light-emitting elements is placed in a mounting direction different from a mounting direction of the other light-emitting elements.

* * * * *